Jan. 7, 1964  J. M. DREES ETAL  3,116,934
ADJUSTABLE CHUCK
Filed Dec. 24, 1962  2 Sheets-Sheet 1

INVENTOR.
DOMINIC C. MERCURIO
JOSEPH M. DREES
DONALD A. DANIELSON
BY John F. Lawler
ATTORNEY

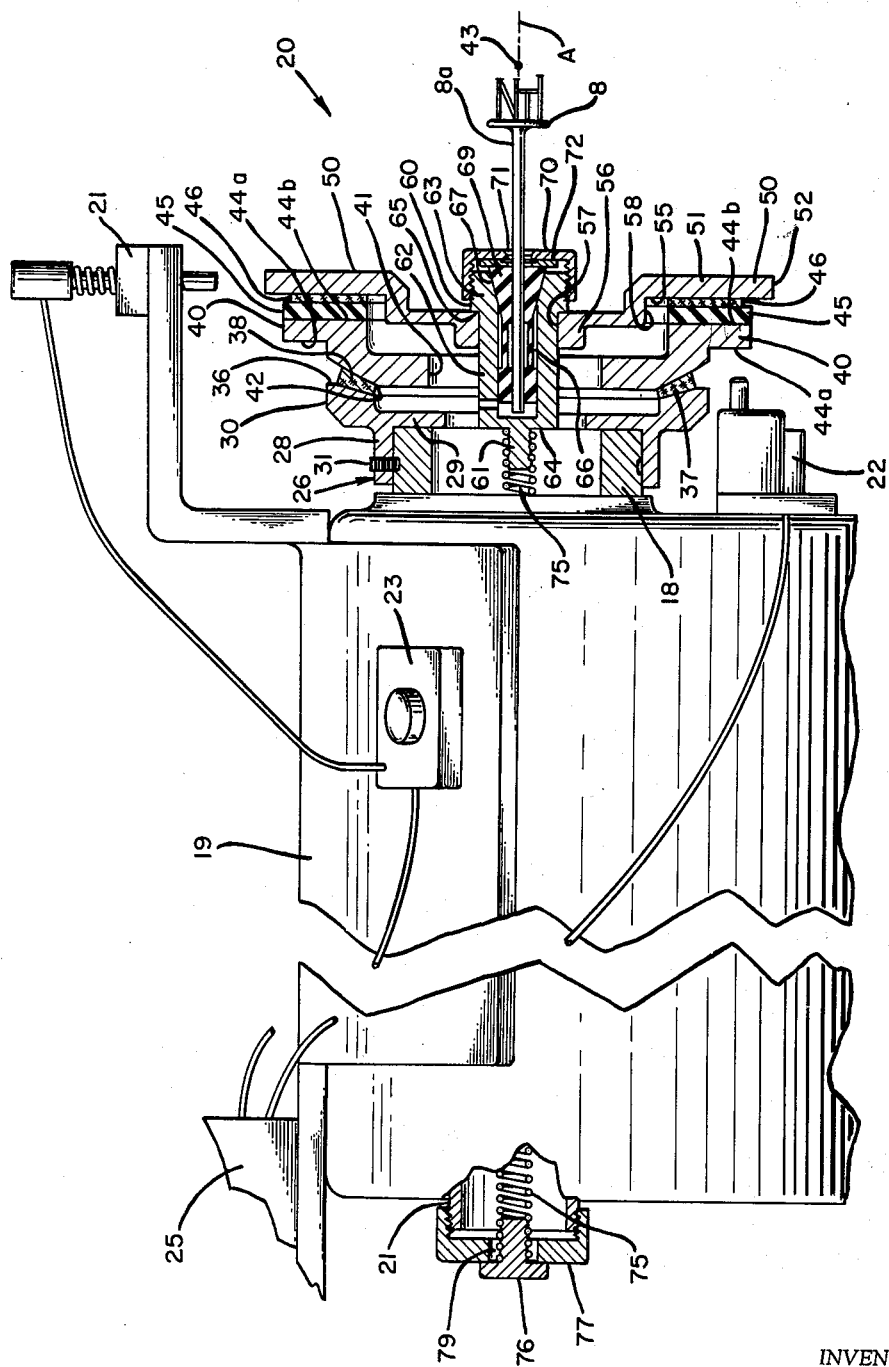
INVENTORS
DOMINIC C. MERCURIO
JOSEPH M. DREES
DONALD A. DANIELSON
BY *John F. Lawler*
ATTORNEY

United States Patent Office 3,116,934
Patented Jan. 7, 1964

3,116,934
ADJUSTABLE CHUCK
Joseph M. Drees, Saratoga, Dominic C. Mercurio, San Jose, and Donald A. Danielson, Los Gatos, Calif., assignors to Sylvania Electric Products Inc., a corporation of Delaware
Filed Dec. 24, 1962, Ser. No. 246,749
6 Claims. (Cl. 279—16)

This invention relates to adjustable chucks for lathes and more particularly to a chuck which is adjustable for both angular and radial misalignments relative to a reference axis.

One form of a traveling wave tube uses a glass envelope to both support and house the slow wave structure, the apertured electrodes and similar parts which comprise the internal structure of the device. Prior to final assembly, the envelope comprises an elongated one-piece barrel and bulb unit and a separate header. The electron gun is supported on the header and is inserted into the bulb during assembly. The glass peripheral flange on the header is then sealed to the correspondingly shaped end of the bulb to complete the envelope. The barrel part of the bulb-barrel unit encloses and supports the helix.

The final step in the assembly of the traveling wave tube consists of joining the header and the bulb while gun and helix axes are aligned in a lathe. The header is held in the headstock chuck. The bulb is held in the tailstock chuck, and the latter is moved longitudinally toward the headstock until these parts abut. Assuming the helix and gun are accurately in alignment, heat is applied to seal abutting edges of the header and bulb.

Precise alignment of the gun and helix axes prior to sealing requires equally precise axial alignment of the supporting chucks relative to the working axis of the lathe. Such precision either is not readily available in present lathes or can be achieved only by tedious time consuming trial and error adjustment. For purposes of discussion, misalignment of gun and helix axes consists of an offset or radial misalignment and/or a skewed or angular misalignment. Likewise, the term "working axis" is defined as the axis collinear with the axes of symmetry of the spindles housed in the headstock and tailstock of the lathe.

Alignment of the gun and helix axes during assembly also requires equally precise alignment of the axes of the chucking surfaces of the tube parts with the working axis. (A chucking surface is the surface of the tube part held by the chuck.) However, tube parts often lack concentricity between the chucking surfaces and the helix and gun attached to these surfaces. As a result, the helix and gun axes are often offset and/or skewed relative to each other after the bulb and header are chucked in the lathe. Chucks have been proposed with features compensating for both types of misalignment but such chucks are generally complex and require considerable operator skill and time to adjust.

An object of this invention is the provision of a chuck with built-in features permitting rapid compensation of angular and radial misalignments in the chuck, in associated structures on which the chuck is supported, and in the part held by the chuck.

Another object is the provision of a compensating chuck that can be adjusted for such alignment errors while the chuck is rotating and is holding a workpiece.

A further object is the provision of a chuck of the type described that can be adjusted while rotating by a semi-skilled operator without unduly complex apparatus and without danger to the operator.

Still another object is the provision of an adjustable chuck and adjustment mechanism therefor which are readily adaptable for use on a standard lathe.

Other objects and advantages of the invention will become apparent from the following description of an illustrative embodiment thereof considered with the accompanying drawings in which:

FIGURE 2 is a side elevation of part of the lathe headstock with the associated chuck shown in cross section;

Figure 1:
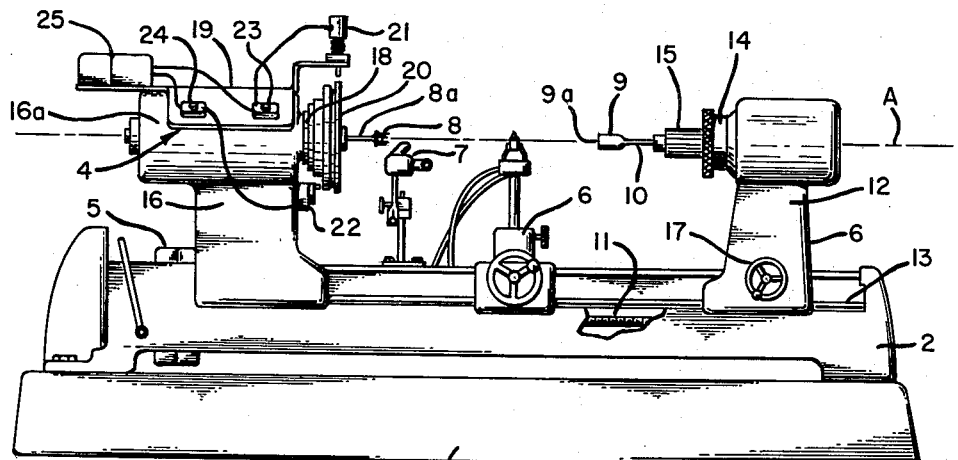
FIGURE 1 is a side elevation of a tube forming lathe on which is mounted a chuck and chuck adjustment mechanism constructed in accordance with the invention.

Referring now to FIGURE 1, a chuck embodying the invention is mounted on a lathe having a working axis A and a bed 2 mounted on a base 3. Bed 2 supports the headstock 4 and the drive assembly 5 in a fixed position at one end, and the longitudinally movable tailstock 6 at the other end. A longitudinally movable flame-welding carriage 6 is supported on the bed between the headstock and tailstock, and an optical inspection device 7 is fixed between the carriage and headstock.

The workpiece is supported on axis A by the headstock and tailstock, and may consist of two separate pieces, such as the header 8 of a traveling wave tube and the companion piece comprising the bulb 9 and barrel 10. The header 8 is to be joined to the inner unsupported end 9a of the bulb and is supported in the lathe by a tubular vacuum stem 8a projecting from the header and which is removed in the final stages of assembly. Both parts of the traveling wave tube are rotated by the drive assembly 5, the tailstock and headstock being connected to the latter by rotary drive screw 11.

Tailstock 6 has a pedestal 12 slideably mounted to guideway 13 and a spindle 14 which is driven by screw 11. A chuck 15, locked on and rotatable with the spindle, grips one end of the bulb 9. The entire tailstock can be moved longitudinally by handwheel 17.

Headstock 4 includes a pedestal 16 fixed on bed 2 and a cylindrical upper housing 16a which mounts a spindle 18 on axis A and a chuck 20 secured to and rotatable with the spindle. Chuck 20 has the alignment adjusting features with which the invention is concerned and is described in detail below. The mechanism for automatically effecting alignment adjustment of the chuck 20 includes a vertically acting solenoid 21 supported over the chuck by support plate 19 which is fastened to the top of the housing, and an axially acting solenoid 22 mounted on the side of pedestal facing chuck 20. (In this application, the term "solenoid" refers to an electrically energizable coil located coaxially of a plunger.) The solenoids are actuated by switches 23 and 24 supported on plate 19 and electrically connected to circuit components housed in enclosure 25.

Referring now to FIGURE 2, chuck 20 is adjustably attached to spindle 18 by means of an annular member or spindle adaptor 26. Spindle adaptor 26 comprises a cylindrical rear wall 28, a central inner flange 29 and a forwardly projecting annulus 30. Wall 28 and flange 29 form a seat for engaging the end of the spindle, and set screws, one of which is shown at 31, extend through wall 28 to engage a groove in the spindle periphery to lock these parts together. For the purpose of this description, the parts of the chuck facing the tailstock (to the right in FIGURE 2) are facing in the "forward" direction, and conversely, the opposite direction is to the "rear."

The forward face 36 of annulus 30 is frusto-conically shaped and has suitable friction means, such as pad 37, preferably made of cork, of an identical contour permanently secured thereto. Pad 37 has a forward frusto-conical surface 38 adapted to frictionally engage an annular number or adjusting plate 40 so as to normally restrain relative movement between the plate 40 and adaptor 26 (e.g., to lock the parts together) but to permit limited movement therebetween when the plate is struck by a sharp blow during angular adjustment of the chuck as described below. Rotary drive motion of the spindle is positively transmitted to plate 40 through the friction pad 37.

Plate 40 has a central opening 41 and an outwardly flared rear surface 42 in tangential contact with pad 37, surface 42 defining a portion of a sphere having a center of formation at 43. Plate 40 also has rear and forward faces 44a and 44b, respectively, near its periphery which are normal to axis A. Rear face 44a is located adjacent to solenoid 22 mounted on the pedestal of the headstock. Plate 40 is connected at its forward face 44b to an axially adjacent annular member or radial adjusting plate 50 by disc cushions 45 and 46, preferably made of rubber and cork, respectively, the latter serving as a friction means similar to pad 37. These two cushions are cemented together and rubber cushion 45 is secured to face 44b of plate 40 by a suitable adhesive.

Radial adjusting plate 50 has a radial outer portion 51 having a peripheral edge 52 aligned with solenoid 21 and a rear face 55 in contact with cork cushion 46. Plate 50 also includes a hub 56 having a bore 57. A shoulder 58 is formed between the outer portion and the hub of the plate 50.

Located in engagement with the hub 56 is rigid collet adaptor 60 comprising a threaded rearward stub 61, a tubular body 62, and an externally threaded forward step 63. The diameters of the stub 61, body 62 and step 63 are successively larger providing external shoulders 64 and 65 between stub and body and between body and step, respectively. The body 62 is press fitted into place hub 56 and shoulder 65 abuts against the front face of the hub. A central recess 66 is formed in the body 62 and step 63 for receiving a collet 67. The front end of recess 66 is flared as shown.

Collet 67 is preferably made of a firm resilient material, such as rubber, and has a central opening to receive the stem 8a of the header 8. The forward portion of the collet typically has annularly spaced longitudinal slots which define annular gripping fingers 69 having flared outer surfaces adapted to engage the flared inner surface of recess 66. Threaded cap 70 has an opening 71 in its end wall to receive header stem 8a. The cap carries an internal washer 72 which engages the forward protruding ends of the collet fingers as the cap is threaded on and is moved axially on step 63.

In order to hold the plates 40 and 50 tightly together and against spindle adaptor 26, an elongated helical spring 75 extends axially within the spindle for its entire length and connects collet adaptor 60 to the rear end of the spindle. The relaxed diameter of spring 75 is about the same as that of collet adaptor stub 61. When the spring is slipped over the stub and is placed in tension, the external threads on the stub are positively engaged by the turns of the spring and secure mechanical connection is made. The opposite end of spring 75 similarly slips over the threaded shank of bolt 76 which is supported in an end cap 77 threaded on the rear end of the spindle. The tension on the spring may be adjusted by changing the position of cap 76 on the spindle.

The arrangement of the chuck parts and the manner in which they are supported as described above permits two major adjustments affecting the axial alignment of the workpiece held by the collet 67. The first such adjustment is made by controlled radial displacement of plate 50 relative to plate 40. More specifically, the rear surface 55 of plate 50 moves radially (downwardly as viewed in FIGURE 2) relative to the cork disc 46. The second adjustment involves angular displacement of plate 40 together with plate 50 relative to spindle adaptor 26. More particularly, the adjustment results from movement of plate 40 along its spherically shaped rear surface 42 relative to friction pad 37 on adaptor 26. Spring 75 yields to permit both of these adjustments while maintaining a compressive force on the fritionally connected parts.

An important feature of the arrangement is that the two adjustments are essentially independent of each other. In other words, it is essential that plate 40 does not move relative to adaptor 26 during the first or radial adjustment involving movement of plate 50 relative to plate 40. Likewise, it is important that plate 50 remain stationary relative to plate 40 during the second adjustment involving the angular movement of plate 40 relative to spindle adaptor 26.

Adjustment of the axis of the chuck 20 to compensate for misalignments is achieved by the pairs of solenoids 21 and 22 which have plungers movable into and out of engagement with the radial adjusting plate 40 and angular adjusting plate 50. The plunger of solenoid 21 moves down against plate 50 and radially displaces the latter incrementally with each impact. The plunger of solenoid 22 moves generally parallel to the axis A of the chuck and against the lowermost (as viewed) rear surface of plate 40 and angularly displaces the collect axis upward by a limited amount with each impact. The solenoids are independently actuated by suitable controls described below. The magnitudes of the radial and angular displacements needed to complete the adjustment are relatively small, say ⅛ inch and 8 degrees, respectively, and the increment of displacement with each impact of the plunger is considerably smaller.

Figure 4:
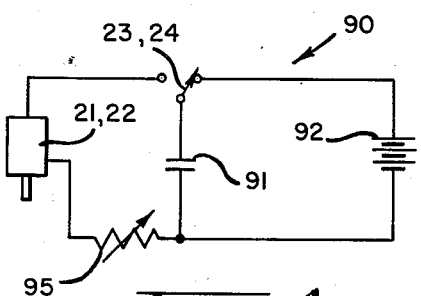
FIGURE 4 is a circuit diagram of the alignment mechanism.

Each plunger is operated independently of the other through an energizing circuit 90, see FIGURE 4, comprising a capacitor 91, a power supply 92, and the solenoid 19 or 22 connected in shunt through two-pole switch 23 and 24. A variable resistor 95 is connected between one plate of the capacitor and a terminal of the solenoid to adjust level of current through the solenoid and thus the force of the impact delivered by the plunger. With the switch in the position shown, the capacitor is charged by supply 92. When the switch arm is moved to the other pole, the capacitor discharges through the solenoid.

The invention will be more clearly explained in the following description of the joining and sealing of the header 8 and bulb 9. As shown in FIGURES 1 and 2, the vacuum stem 8a of header 8 is inserted within chuck collet 67 and is firmly though delicately secured by the collet jaws by rotation of the collet cap 70. Care is taken to locate the end of the gun held by header 8 in a transverse plane which passes through the center of formation 43 of the surface 38 of plate 40. Thereafter the compressive force governing the frictional engagement between adapter 26, plate 40 and plate 50 is adjusted to the correct level by changing the tension of spring 75 by means of nut 76. The barrel 10 of the barrel and bulb unit is similarly mounted in tailstock chuck 15 and the tailstock is then moved longitudinally until the end 9a of the bulb 9 is adjacent to but slightly longitudinally spaced from the header. The lathe drive motor is turned on and the header 8 rotates in synchronism with the bulb 9.

The inspection device 7, a microscope, is focused on adjacent ends of the gun and helix and any misalignment of their respective axes of rotation is observed. The working axis A of the lathe is established through the adjustment of the cross hairs on the microscope and the spacial relationship of the gun and helix axes to this axis established.

Figure 3:
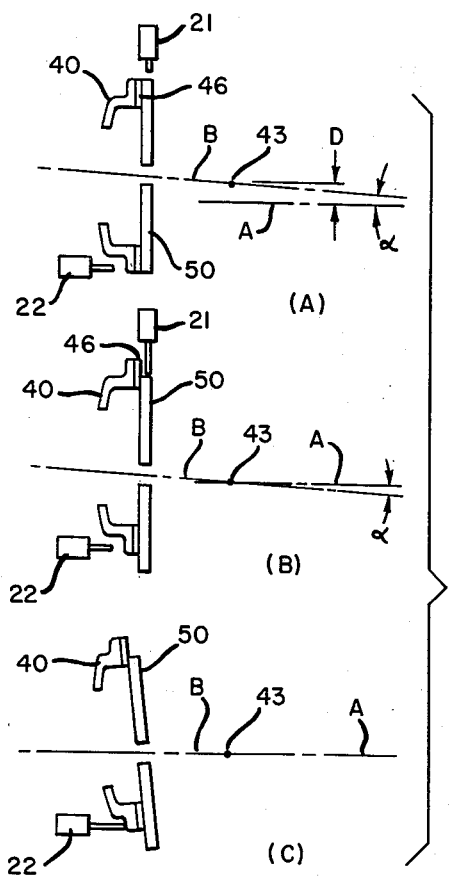
FIGURE 3 is a schematic diagram of the chuck and adjusting mechanism illustrating the steps of aligning the chuck axis with the working axis of the lathe.

Assume that the lathe of FIGURE 1 is a high precision lathe in which the axis of the gun of the header 8 held by the chuck 20 is slightly skewed (angularly misaligned) with respect to working axis A as a result of misalignment between the axis of the chucking surface of the header and the headstock spindle axis. Also assume that the axis of the gun is radially offset from the working axis A at the end thereof defined by the center of formation 43 (vertically spaced apart as viewed), and that the axis of the helix held by the tailstock chuck is collinear with the working axis. These relationships are illustrated in FIGURE 3a which shows axis B of the gun held by the header at an angle α with working axis A, which is the rotation axis of bulb 9, and radially offset from axis A by a distance D at point 43.

Radial adjustment of the gun axis B takes place while the chuck is rotating. Solenoid 21 is energized and its plunger moves down, as viewed, and strikes the edge of plate 50 at the precise moment the plate is displaced a maximum distance above the true working axis and with sufficient force to overcome the frictional forces between the plate and the cushion 46. The operator times the actuation of the solenoid energizing switch by observing the rotating parts through microscope 7. With each impact of the plunger, plate 50 together with collet 67 and header 8 are displaced radially down by a certain increment, and the process is repeated until the axis of the gun at the end thereof intersects the axis A as shown in FIGURE 3b.

Angular adjustment of the gun axis is achieved by energizing axially acting solenoid 22 through a separate control circuit 90. As switch 24 is closed, its plunger moves forwardly parallel to axis 3 and strikes the rear surface of adjusting plate 40 at the precise moment the longitudinal spacing of the plunger and plate is minimum, as determined optically as described above. The force of impact overcomes the frictional bond between plate 40 and friction pad 37 on adaptor 26 and both plate 40 and plate 50 are angularly displaced or "rotated" slightly relative to the axis A. This operation is repeated until the axis of the gun and the axis A are collinear, see FIGURE 3c. As this angular adjustment of the chuck is made, vibrations caused by the impact of the plunger created during the adjustment against the plate 40 are essentially absorbed by resilient cushion 45 on the front of plate 40 so that none are transmitted to plate 50. Thus, there is no inadvertent slippage between radial plate 50 and annular plate 40.

After radial and angular adjustments of the gun axis are complete and this axis is collinear with the working axis within ±0.0005 inch at center of formation 43, the abutting edges of the glass header and glass bulb are heat sealed by means of flame carriage 6, see FIGURE 1.

Having fully described the preferred embodiment of the invention, variations and modifications may now occur to those skilled in the art. For example, adjustments of the chuck axis may be effected by means other than solenoids, for example, by a programmed cam arrangement, without departing from the spirit of the invention. The invention is defined by the appended claims.

What is claimed is:

1. Adjustable chucking apparatus for holding a workpiece having an axis and being adaptable to radially and angularly move said axis relative to a reference axis, comprising an adaptor supported for rotation about a fixed axis extending generally in the direction of said reference axis, a first plate axially adjacent to said adaptor having an annular spherically-shaped surface on the side of the plate facing the adaptor and having an annular flat surface on the opposite side, said spherically-shaped surface having a center of formation on said workpiece axis, a second plate axially adjacent to said first plate on the opposite side of the latter from said adaptor, said second plate having a peripheral edge and having an annular flat surface facing and registered with the flat surface of the first plate, first friction means mechanically interconnecting the spherically-shaped surface of the first plate and the adaptor, second friction means mechanically interconnecting the flat surfaces of the first and second plates, means for adjustably axially forcing said adaptor and plates together whereby to vary the degree of frictional engagement between the adaptor and the first plate and between the first and second plates, a first solenoid supported adjacent to the second plate and having a plunger movable generally normal to and adapted to strike the peripheral edge of the second plate whereby the latter is moved transversely of the reference axis relative to the first plate, a second solenoid supported adjacent to the first plate, said second solenoid having a plunger movable generally in the direction of the reference axis and being adapted to strike said first plate whereby to angularly move said first and second plates relative to said adaptor, and means for independently energizing said solenoids for actuating said plungers.

2. Adjustable chucking apparatus for holding a workpiece having an axis and being adaptable to radially and angularly move said axis relative to a reference axis, comprising an adaptor supported for rotation about a fixed axis extending generally in the direction of said reference axis, a first plate axially adjacent to said adaptor having a curved surface on the side of the plate facing the adaptor and having an annular surface on the opposite side, said curved surface having a center of formation on said workpiece axis, a second plate axially adjacent to said first plate on the opposite side of the latter from said adaptor, said second plate having a peripheral edge and having an annular surface facing and registered with said annular surface of the first plate, first friction means mechanically interconnecting the curved surface of the first plate and the adaptor, second friction means mechanically interconnecting said annular surfaces of the first and second plates, means for adjustably axially forcing said adaptor and plates together whereby to vary the degree of frictional engagement between the adaptor and the first plate and the second plate, first plunger means supported adjacent to the second plate for movement generally normal to and adapted to strike the peripheral edge of the second plate whereby to move the latter transversely of the reference axis relative to the first plate, second plunger means supported adjacent to the first plate for movement generally in the direction of the reference axis and adapted to strike said first plate whereby to angularly move said first and second plates relative to said adaptor, and means for independently actuating said plunger means.

3. Adjustable chucking apparatus for holding a workpiece having an axis and being adaptable to radially and angularly move said axis relative to a reference axis, comprising an adaptor supported for rotation about a fixed axis extending generally in the direction of said reference axis, a first plate axially adjacent to and frictionally engaging said adaptor and adapted to move relative to said adaptor along a curved path having a center of formation on said workpiece axis, a second plate axially adjacent to and frictionally engaging said first plate on the opposite side of the latter from said adaptor, said second plate having a coaxial outer edge, means for adjustably axially forcing said adaptor and plates together whereby to vary the degree of frictional engagement between the adaptor and the first plate and between the first plate and the second plate, first plunger means supported adjacent to the second plate for movement in a direction generally transversely of and adapted to strike the outer edge of the second plate whereby to move the latter transversely of the reference axis relative to the first plate, second plunger means supported adjacent to the first plate for movement generally in the direction of the reference axis and adapted to strike said first plate whereby to angularly move said first and second plates relative to said adaptor, and means for independently actuating said plunger means.

4. Mechanism for releasably holding a workpiece having an axis and for aligning said axis with a reference axis, comprising first, second and third annular members disposed in successively adjacent positions generally along the reference axis, the workpiece being held by said third member, first friction means between the first and second members and second friction means between the second and third members, means for adjustably forcing said members together and mechanically interconnecting adjacent members through the interposed friction means whereby adjacent members are relatively movable when the bond of the friction means is exceeded, means for constraining the relative movement of the first and second members to angular displacements with respect to said reference axis.

means for constraining relative movement of the second and third members to a direction transverse to the reference axis, and means for independently inducing said relative movement of the first and second members and said relative movement of the second and third members.

5. The mechanism according to claim 4 with means for rotating the second and third members through said first member about a fixed axis extending generally in the direction of said reference axis, said movement inducing means being operable during rotation of said members.

6. A chucking device attached to a spindle of a lathe for locating a workpiece in alignment with a working axis, comprising a spindle adaptor having a side wall attached to said spindle and having an annulus portion, said annulus portion having a frusto-conical surface remote from said spindle, a first plate having an annular spherically-shaped surface with a center of formation on said working axis, said plate also having first and second flat face near the plate periphery, first friction means interconnecting the spherically-shaped surface of the first plate and the adaptor, a second plate having a peripheral edge and a face extending generally parallel to the second face of the first plate, said second plate having a hub formed with a bore coaxial of said peripheral edge, a second friction means mechanically interconnecting the flat surfaces of the first and second plate members, a collet adaptor secured within said bore of the second plate, means attached to said spindle and to said collet adaptor for urging said second plate against said first plate and said first plate against said spindle adaptor, a collet having a bore within which a workpiece is releasably secured, said collet being movable relative to said collet adaptor for engaging and releasing said workpiece, first and second solenoids supported on said headstock in locations adjacent to respective first and second plates, said first solenoid being located adjacent to the first face of said first plate, said second solenoid being located in registry with and adjacent to said peripheral edge of said second plate, and means for energizing said solenoids independently of each other whereby to impact against said first and second plates, respectively.

References Cited in the file of this patent
UNITED STATES PATENTS

| | | |
|---|---|---|
| 2,547,522 | Eichelman | Apr. 3, 1951 |
| 2,675,242 | Olson | Apr. 13, 1954 |
| 2,767,564 | Green | Oct. 23, 1956 |
| 2,968,487 | Glynn | Jan. 17, 1961 |